United States Patent
Tjahjono et al.

(10) Patent No.: US 11,522,626 B2
(45) Date of Patent: Dec. 6, 2022

(54) ACQUIRING CURRENT TIME IN A NETWORK

(71) Applicant: Hitachi Energy Switzerland AG, Baden (CH)

(72) Inventors: Danu Tjahjono, Dublin, CA (US); Rafiq Shaikh, Santa Clara, CA (US); Ajay K. Dassu, San Jose, CA (US)

(73) Assignee: Hitachi Energy Switzerland AG, Baden (CH)

( * ) Notice: Subject to any disclaimer, the term of this patent is extended or adjusted under 35 U.S.C. 154(b) by 125 days.

(21) Appl. No.: 16/838,784

(22) Filed: Apr. 2, 2020

(65) Prior Publication Data

US 2021/0314077 A1    Oct. 7, 2021

(51) Int. Cl.
*H04J 3/06* (2006.01)
*H04L 9/40* (2022.01)
*H04L 69/28* (2022.01)

(52) U.S. Cl.
CPC .......... *H04J 3/0667* (2013.01); *H04J 3/0644* (2013.01); *H04L 63/0823* (2013.01); *H04L 69/28* (2013.01)

(58) Field of Classification Search
CPC ...... H04J 3/0658; H04J 3/0661; H04J 3/0667; H04J 3/0673; H04J 3/0635; H04J 3/0638; H04J 3/0644; H04L 63/0823; H04L 69/28
See application file for complete search history.

(56) References Cited

U.S. PATENT DOCUMENTS

| | | | | |
|---|---|---|---|---|
| 6,889,212 B1* | 5/2005 | Wang | ............... | G06Q 30/018 370/259 |
| 9,450,758 B1* | 9/2016 | Allen | ............... | H04L 9/3297 |
| 2001/0002485 A1* | 5/2001 | Bisbee | ............... | G07F 7/12 713/167 |
| 2003/0172145 A1* | 9/2003 | Nguyen | ............... | H04L 12/1403 709/223 |
| 2004/0119639 A1* | 6/2004 | Gilkes | ............... | G04G 7/00 342/357.52 |
| 2006/0042453 A1* | 3/2006 | Yanase | ............... | G10H 1/0058 84/600 |
| 2006/0095553 A1* | 5/2006 | Ogawa | ............... | G06F 21/725 709/223 |
| 2008/0056494 A1* | 3/2008 | Jacobson | ............... | H04L 63/166 380/255 |

(Continued)

OTHER PUBLICATIONS

Dong, J. et al., "Secure Group Communication in Wireless Mesh Networks," Ad Hoc Networks, Elsevier, vol. 7, No. 8, Nov. 1, 2009, 14 pages.

(Continued)

*Primary Examiner* — Kevin D Mew
(74) *Attorney, Agent, or Firm* — Slater Matsil, LLP

(57) ABSTRACT

Exemplary of embodiments of the disclosure include a method which includes determining, by a first device, whether the first device has a current time and transmitting a request for the current time to a second device if the first device does not have the current time. The second device is in a local network. The method further includes receiving, by the first device, the current time from the second device, authenticating a certificate based on the current time received from the second device, and establishing a network connection to the local network based on the authenticated certificate.

20 Claims, 6 Drawing Sheets

(56) References Cited

U.S. PATENT DOCUMENTS

| | | | |
|---|---|---|---|
| 2009/0100512 A1* | 4/2009 | Schneider | H04L 63/20 |
| | | | 726/10 |
| 2009/0144399 A1* | 6/2009 | Schneider | H04L 12/6418 |
| | | | 709/220 |
| 2015/0195599 A1* | 7/2015 | Su | H04N 21/242 |
| | | | 725/93 |
| 2016/0380749 A1* | 12/2016 | Jose | H04L 69/40 |
| | | | 709/248 |
| 2017/0034154 A1* | 2/2017 | Abbondanzio | G06F 21/33 |
| 2017/0055236 A1 | 2/2017 | Levesque et al. | |
| 2017/0104748 A1* | 4/2017 | Koster | H04L 9/3268 |
| 2017/0104749 A1* | 4/2017 | Koster | H04W 12/069 |
| 2017/0148018 A1 | 5/2017 | Levin | |
| 2019/0132932 A1* | 5/2019 | Klecha | H05B 45/60 |

OTHER PUBLICATIONS

Hieriz, G. et al., "IEEE 802.11s: The WLAN Mesh Standard," IEEE Wireless Communications, Coordinated Science Laboratory; Dept. Electrical and Computer Engineering; University of Illinois at Urbana-Champaign, vol. 17, No. 1, Feb. 1, 2010, 8 pages.

* cited by examiner

ACQUIRING CURRENT TIME IN A NETWORK

TECHNICAL FIELD

The present disclosure relates generally to networking, and, in particular embodiments, to acquiring current time.

BACKGROUND

Embedded devices without real time clocks (RTC) generally receive a current time from a global position service (GPS) server or a network time protocol (NTP) server. However, some devices may not have GPS functionality and/or may be unable to connect to a GPS server or an NTP server. For example, for devices that do not have GPS functionality or cannot connect to a GPS server, the device does not have an alternate mechanism of acquiring a current time without connecting to the NTP server. Accordingly, in such devices, there is no alternate mechanism for acquiring a current time unless a network connection to the NTP server can be established.

SUMMARY

Various embodiments provide a mechanism for a device to acquire a current time without connecting to an NTP server or GPS.

In accordance with an embodiment of the present disclosure, a method includes determining, by a first device, whether the first device has a current time and transmitting, by the first device, a request for the current time to a second device in a local network if the first device does not have the current time. The method further includes receiving, by the first device, the current time from the second device, authenticating, by the first device, a certificate based on the current time received from the second device, and establishing, by the first device, a network connection to the local network based on the authenticated certificate.

In accordance with an embodiment, a method includes receiving, by a first device, a current time from a second device prior to the first device establishing a network connection and authenticating, by the first device, a certificate based on the current time received from the second device. The second device is connected to a local network. The method further includes establishing, by the first device, the network connection to the local network based on the authenticated certificate and connecting, by the first device, to a network time protocol (NTP) server through the network connection to the local network.

In accordance with an embodiment, an apparatus comprises a processor configured to determine whether the apparatus has a current time and a transmitter configured to transmit a request for the current time to another apparatus if the apparatus does not have the current time. The apparatus further includes a receiver configured to receive the current time from the another apparatus in a local network. The processor is further configured to authenticate a certificate based on the current time received from the another apparatus; and establish a network connection to the local network based on the authenticated certificate.

BRIEF DESCRIPTION OF THE DRAWINGS

Aspects of the present disclosure are best understood from the following detailed description when read with the accompanying figures.

DETAILED DESCRIPTION OF ILLUSTRATIVE EMBODIMENTS

Figure 1:
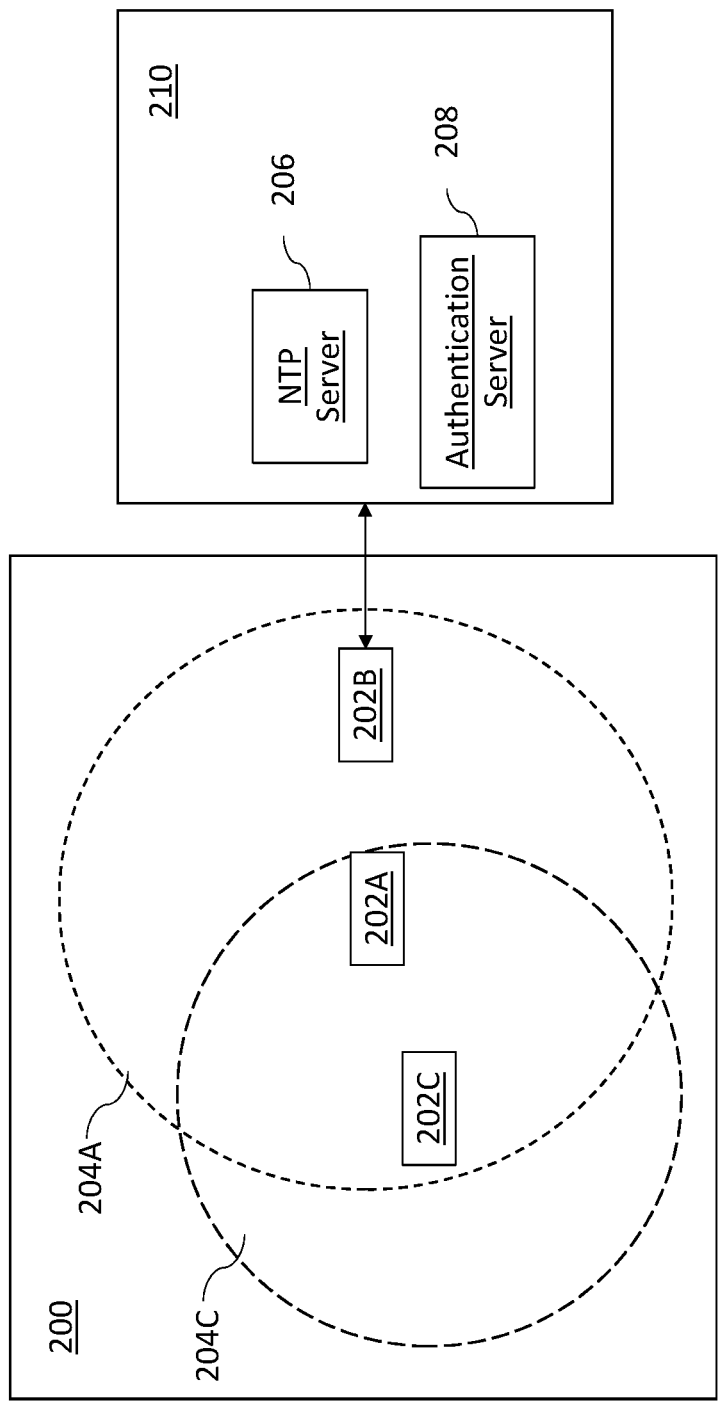
FIG. 1 is a block diagram of a network according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Figure 2:
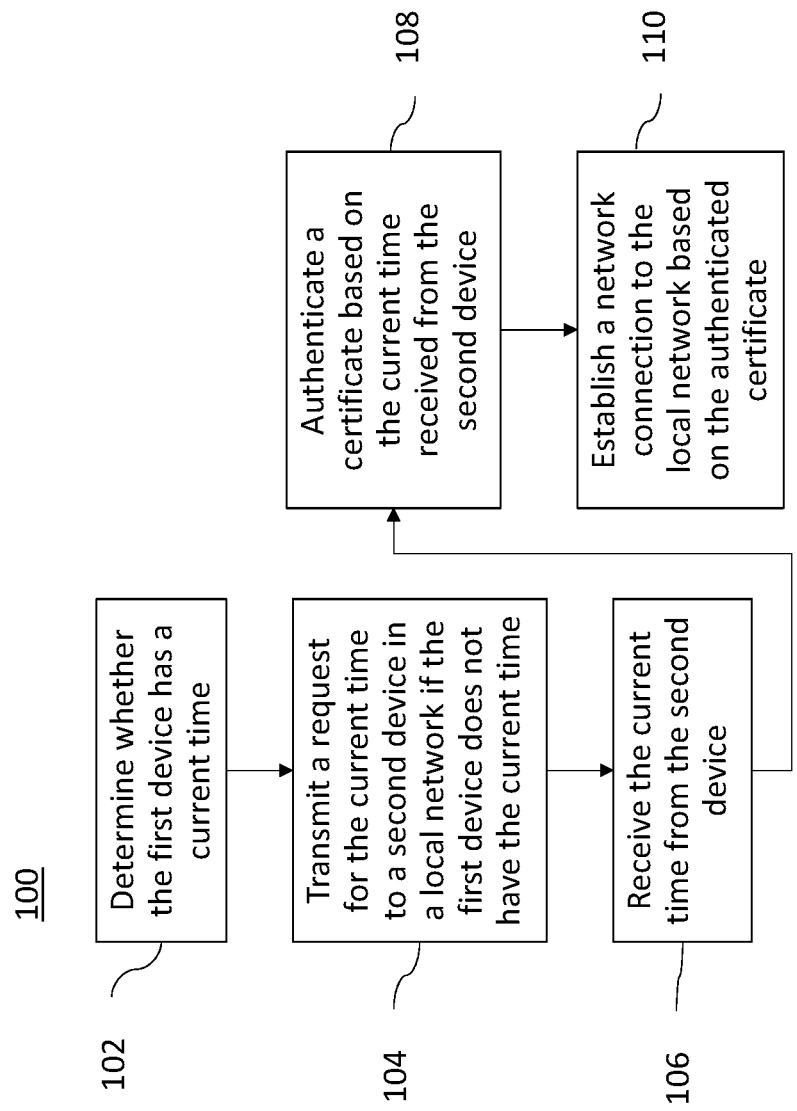
FIG. 2 is a flow chart of a method according to some embodiments.

FIG. 1 illustrates a block diagram of a local network 200 having devices 202A, 202B, and 202C FIG. 2 illustrates a flow chart 100 of a method for acquiring a current time (sometimes referred to as a current clock time or a current calendar time) according to some embodiments. The devices 202A and 202C of FIG. 1 may each implement the method of flow chart 100. The local network 200 may be a wireless network and may be alternately referred to as a local wireless network or a wireless local area network.

In some embodiments, the flow chart 100 may be implemented by a first device (e.g., either one of the device 202A or the device 202C of FIG. 1) to receive a current time and establish a network connection based on the received current time. In some embodiments, the first device 202A/202C may be an embedded device in a wireless, local network (e.g., local network 200 of FIG. 1), such as a wireless mesh network, Bluetooth mesh network, or the like. In other embodiments, the local network 200 may be a different type of network.

In some embodiments, the first device 202A/202C may be a device without a real time clock. For example, the first device 202A/202C may not be capable of determining a current time after booting up without receiving the current time from an external source. In some embodiments, the first device 202A/202C may not have a GPS connection. For example, the first device 202A/202C may be a legacy device, and the first device 202A/202C may not have GPS capabilities. As another example, the first device 202A/202C has GPS capabilities but cannot connect to the GPS server due to its location (e.g., when the first device 202A/202C is located inside, underground, or the like), or the like.

In some embodiments, the first device 202A/202C does not have a network connection initially and cannot receive the current time from a NTP server (e.g., NTP server 206 of FIG. 1). For example, the flow chart 100 may be performed prior to the first device 202A/202C connecting to the NTP server 206. In some embodiments, the first device 202A/202C may not be connected to any network prior to performing the blocks of flow chart 100. For example, in FIG. 1, the device 202A and a device 202C may be initially isolated wirelessly. Further, the first device may be in the local network 200 where network authentication would fail if the first device 202A/202C does not have valid, authenticated certificate(s). For example, the local network 200 may be a wireless mesh network which is secured such that the first device 202A/202C's connection to the local network is based on one or more authenticated certificates. Accordingly, the first device 202A/202C may be unable to connect to the local network without acquiring the current time and validating its certificate(s) as current and not expired based on the acquired current time. Flow chart 100 provides a method that allows the first device 202A/202C to receive the current time without a real time clock, GPS connection, or NTP server connection, authenticate one or more certificates based on the current time, and establish a network connecting based on the one or more authenticated certificates.

Flow chart 100 begins with block 102. In block 102, the first device 202A/202C determines whether it has a current time. In some embodiments, determining whether the first device 202A/202C has the current time includes comparing a calendar time of the first device with a sum of a boot-up calendar time of the first device 202A/202C and an elapsed time of the first device 202A/202C. The calendar time of the first device 202A/202C may refer to a time that the first device currently stores. The boot-up calendar time may be a fixed time, and the elapsed time of the first device 202A/202C is an amount of time that has elapsed since the first device 202A/202C booted-up (e.g., since a most recent boot-up of the first device 202A/202C). In some embodiments, determining whether the first device 202A/202C has the current time further includes determining that the first device 202A/202C does not have the current time if the calendar time of the first device 202A/202C is equal to the sum of the boot-up calendar time of the first device 202A/202C and the elapsed time of the first device 202A/202C. For example, it may be determined that the first device 202A/202C does not have the current time if the calendar time of the first device 202A/202C only accounts for an elapsed time since the first device 202A/202C booted-up and does not account for any time when the first device 202A/202C was powered off. In some embodiments, determining whether the first device 202A/202C has the current time further includes determining that the first device 202A/202C does have the current time if the calendar time of the first device is equal to the sum of the boot-up calendar time of the first device 202A/202C and the elapsed time of the first device 202A/202C. In other embodiments, determining whether the first device 202A/202C has the current time includes determining that the first device 202A/202C does have the current time if the first device is connected to the NTP server 206.

Flow chart 100 then proceeds to block 104 where the first device 202A/202C transmits a request for the current time to a second device in a local network if the first device 202A/202C does not have the current time. The second device may refer to either the device 202B or the device 202A. For example, the device 202A may transmit a request of the current time to the device 202B, and the device 202C may transmit a request of the current time to the device 202A. In some embodiments, transmitting the request for the current time includes transmitting the request for the current time in a broadcast. For example, the request for the current time may be broadcast in a probe request based on a Wireless Fidelity (WiFi) standard, and an information element (IE) may be added to the probe request to carry the request for the current time. In other embodiments, the request for the current time may be broadcast based on a different standard (e.g., a Bluetooth standard, or the like). As a result of the broadcast request, every device within a broadcast radius of the first device 202A/202C may receive the request for the current time. For example, FIG. 1 illustrates a broadcast radius 204A of the device 202A, and devices 202B and 202C may each hear a request for the current time that is broadcast by the device 202A. As another example, FIG. 1 illustrates a broadcast radius 204C of the device 202C, and device 202A may hear a request for the current time that is broadcast by the device 202C. Because the device 202B is outside of the broadcast radius 204C, the device 202B may not hear a request for the current time that is broadcast by the device 202C.

The first device 202A/202C may periodically transmit the request for the current time until it receives the current time or until some other criteria is met. A period between transmitting the request of the current time may be determined according to a preset rule, and in some embodiments, the period may be random, constant, or the like. For example, the first device 202A/202C may use a random backoff procedure to retransmit the request for the current time. In this manner, network congestion may be reduced by reducing the probability of multiple devices persistently and simultaneously re-transmitting current time requests. In embodiments implementing a random period between current time request transmissions, the probability of simultaneous transmission of current time requests by multiple devices (e.g., by the devices 202A and 202C of FIG. 1) is reduced.

In block 106, the first device 202A/202C receives the current time from the second device (e.g., the device 202A or the device 202B of FIG. 1). For example, the device 202A may receive the current time from the device 202B, and the device 202C may receive the current time from the device 202A. In some embodiments, receiving the current time from the second device 202A/202B includes receiving the current time in a unicast. For example, the current time may be received from the second device 202A/202B in a probe response based on a WiFi standard, and an IE may be added to the probe response to carry the current time. In other embodiments, the current time may be received in a unicast based on a different standard (e.g., a Bluetooth standard, or the like). In still other embodiments, receiving the current time from the second device 202A/202B includes receiving the current time in a broadcast by the second device 202A/202B. By broadcasting the current time, other devices in the local network may determine that the second device 202A/202B has responded to the first device 202A/202C's request for the current time. Accordingly, the other devices in the local network do not need to respond to or relay the first device 202A/202C's request of the current time, and network resources can be conserved.

In some embodiments, the current time may be secured cryptographically with a digital signature for security. For example, receiving the current time from the second device 202A/202B may include receiving the current time in a probe response that is secured cryptographically with a digital signature. Thus, the local network can be secured against outside interference. In other embodiments, the current time that is received by the first device 202A/202C is unsecured.

In some embodiments, the second device refers to the device 202B, which may be connected to a backhaul network 210. The backhaul network includes an NTP server 206, and the second device 202B may be connected to the NTP server 206 either through a wired connection (e.g., through one or more backhaul links) or through a wireless connection (e.g., through another device in the local wireless network). The second device 202B transmits its current time that is synchronized with the NTP server 206 to the first device (e.g., the device 202A). For example, in FIG. 1, the device 202A sends a request for the current time to the device 202B. The device 202B is connected to an NTP server 206 in the backhaul network 210, the device 202B synchronizes its current time with the NTP server 206, and the device 202B transmits its synchronized current time to the device 202A.

In some embodiments, the second device refers to the device 202A, which may not be connected to the NTP server 206. The second device 202A may receive the current time from a third device (e.g., device 202B) in the local network and transmit the received current time to the first device (e.g., device 202C). For example, in FIG. 1, the device 202C sends a request for the current time to the device 202A. The device 202A may receive the request for the current time from the device 202C prior to the device 202A receiving the current time from the device 202B. Because the device 202A does not yet have the current time, the device 202A may forward the request for the current time received from the device 202C. For example, the device 202A may transmit device 202C's request for the current time to the device 202B. A request for the current time may be forwarded any number of times (sometimes referred to as hops) in the local network 200, and a request for the current time is not limited to a single forwarding transmission. In some embodiments to conserve network resources, the device 202A may determine whether to forward each received request for the current time according to a random procedure. For example, the device 202A may only forward a subset of requests for the current time that are received to conserve network resources. In some embodiments, the device 202A may determine whether to forward each received request for the current time according to an elapsed time between when a request for the current time was received and when the device 202A transmitted a request for the current time. For example, the device 202A may not forward a request for the current time if the request for the current time was received within a first preset time period of the device 202A transmitting a request for the current time. In some embodiments, the first preset time period is two seconds although the first preset time period may be another value in other embodiments.

In some embodiments, if the device 202A receives the current time from the device 202B within a second preset time period of receiving the request for the current time from the device 202C, then the device 202A may transmit the current time received from the device 202B to the device 202C. If the device 202A does not receive the current time from the device 202B within the second preset time period of receiving the request for the current time from the device 202C, then the device 202A does not transmit the current time received from the device 202B to the device 202C. In this manner, the device 202A determines that the current time transmitted to the device 202B is timely, and the current time response has not drifted too extensively. In some embodiments, the second preset time period is 60 seconds although the second preset time period may be another value in other embodiments. In this manner, requests for current time may be relayed throughout the local network, and all devices in the local time can eventually receive a current time so long as a single device in the local network is connected to the NTP server.

Due to latency in transmission time between at least the second device 202A/202B and the first device 202A/202C, the current time received from the second device 202A/202B may only be accurate within a certain range (e.g., within a few seconds). In some embodiments, the current time received from the second device 202A/202B is sufficiently accurate for the first device 202A/202C to authenticate one or more certificates.

If the first device 202A/202C receives a plurality of current times from a plurality of other devices, the first device 202A/202C may select one of the plurality of received current times as its current time. For example, the first device 202A/202C may select a first current time from the plurality of received current times if the first current time is received prior to other current times of the plurality of received current times. As another example, the first device 202A/202C may select a current time from the plurality of received current times based on a number of hops that each of the plurality of received current times was transmitted. For example, the first device 202A/202C may select a current time received from the second device 202A/202B over a current time received from a third device if the second device is located a fewer number of hops away to the first device than the third device. Other mechanisms for selecting a current time from a plurality of received current times may be used in other embodiments.

Referring back to FIG. 1, flow chart 100 proceeds to block 108 where the first device 202A/202C authenticates a certificate based on the current time received from the second device 202A/202B. For example, the first device 202A/202C may determine that its certificates are valid and not expired based on the current time received from the second device 202A/202B. In some embodiments, the first device 202A/202C is operating in a first mode where validating its certificates is a pre-requisite to connecting to the local network. The first device 202A/202C may validate its certificate(s) with an authentication server (e.g., authentication server 208) in the backhaul network 210 through a third device (sometimes referred to as an authenticator device). The third device forwards an authentication request from the first device 202A/202C to the authentication server 208. The authentication request may include one or more certificates of the first device 202A/202C, and the authentication server 208 may indicate to the third device whether to grant the authentication request based on the one or more certificates. For example, the authentication server indicates to the third device whether the one or more certificates of the first device 202A/202C are valid. The third device may be any device with a connection to the backhaul network and that can communicate with the first device 202A/202C. In some embodiments, the third device is the second device 202B that transmitted the current time to the first device. In other embodiments, the third device is a different device in the local network. For example, in FIG. 1, the device 202B is connected to the backhaul network 210, which includes an authentication server 208. The device 202A may transmit its certificate(s) in an authentication request to the device 202B. The device 202B then forwards the authentication request to the authentication server 208, which indicates to the device 202B whether to grant the authentication request from the device 202A based on the certificate(s) (e.g., the authentication server 208 may indicate whether the certificate(s) are valid).

In block 110, the first device 202A/202C establishes a network connection to the local network based on the authenticated certificate. For example, the third device may allow the first device 202A/202C to connect to the local network based on an indication from the authentication server that the one or more certificates of the first device are valid. The first device 202A/202C may then acquire an IP address in the local network and begin communicating with external devices through the local network. In some embodiments, the first device 202A/202C may establish a connection to the local network though the third device (e.g., the authenticator device). For example, the first device 202A/202C may establish the connection to the local network through the second device 202A/202B that transmitted the current time to the first device 202A/202C. In other embodiments, the first device 202A/202C may establish the connection to the local network 200 through a different device than the second device 202A/202B that transmitted the current time to the first device 202A/202C. As another example, the third device may refuse to allow the first device 202A/202C to connect to the local network 200 based on an indication from the authentication server 208 that the one or more certificates of the first device 202A/202C are invalid.

In some embodiments, the first device 202A/202C may then connect to the NTP server 206 through the local network 200 and synchronize the current time with the NTP server 206. The current time that is synchronized with the NTP server 206 is more accurate than the current time received from the second device 202A/202B. For example, due to transmission latency, the current time received from the second device 202A/202B may be accurate only within a certain range (e.g., a few seconds or more). The transmission latency may be even greater if the current time is transmitted through multiple hops in the local network 200. In contrast, the current time synchronized with the NTP server 206 may be accurate within 100 ms or less, for example.

After the first device synchronizes the current time with the NTP server 206, the first device 202A/202C may transmit the synchronized current time if the first device 202A/202C receives a request for the current time from another device. For example, referring to FIG. 1, if device 202A receives a request for the current time from device 202B after the device 202A connects to NTP server 206 through the local network 200, the device 202A may transmit from the current time synchronized with the NTP server 206 to the device 202B. In this way, after the first device 202A/202C connects to the NTP server 206 through the local network 200, the first device 202A/202C may directly respond to requests for the current time without forwarding the requests.

In some embodiments, establishing the network connection is based on a Zero Touch Provisioning (ZTP) protocol, which allows the first device to connect to the local network with zero or minimal user input. For example, the ZTP protocol may allow the first device 202A/202C to acquire information and configurations of the local network 200 from other devices in the local network 200 without additional user input. In other embodiments, establishing the network connection to the local network 200 may be performed according to a different protocol.

In some embodiments, the first device 202A/202C may be configured to operate in a first mode and a second mode. The first device 202A/202C may operate in the first mode when the first device is in a secured network that requires authenticated certificate(s) to establish a network connection. For example, in the first mode, the first device 202A/202C acquires a current time according to blocks 102, 104, and 106 described above; authenticates one or more certificates based on the received time according to block 108 described above; and connects to the secured network based on the authenticated certificate as described in block 110.

The first device 202A/202C may further operate in the second mode when the first device is in a network that does not require authenticated certificates to establish a network connection. For example, in the second mode, the first device 202A/202C may establish a network connection to the network without first acquiring a current time or authenticating any certificates (e.g., when the first device 202A/202C is already in a secured location). In the second mode, the first device 202A/202C connects to the NTP server 206 through the network connection without the authenticated certificate(s).

Figure 3:
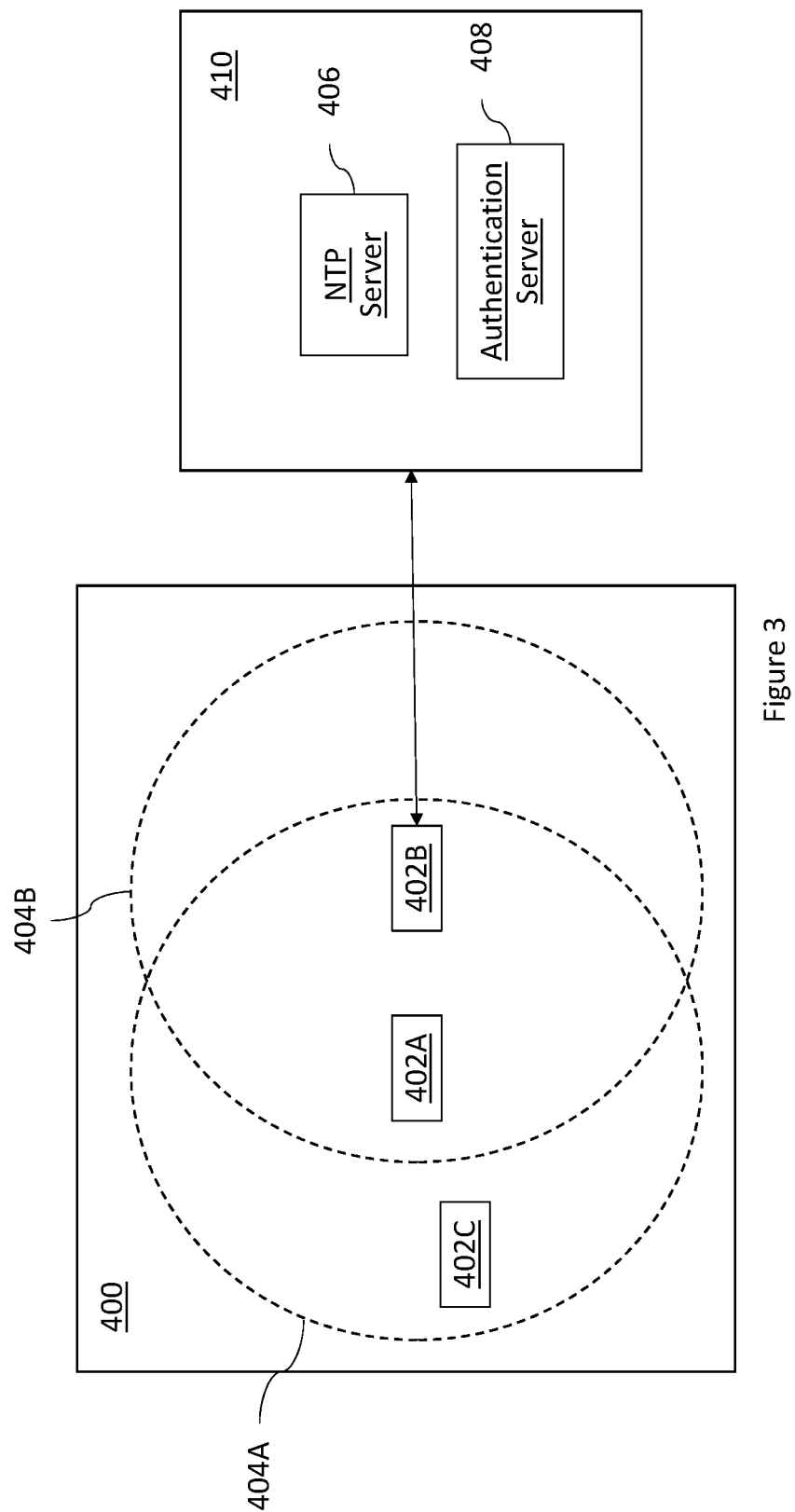
FIG. 3 is a block diagram of a network according to some embodiments.
Figure 4:
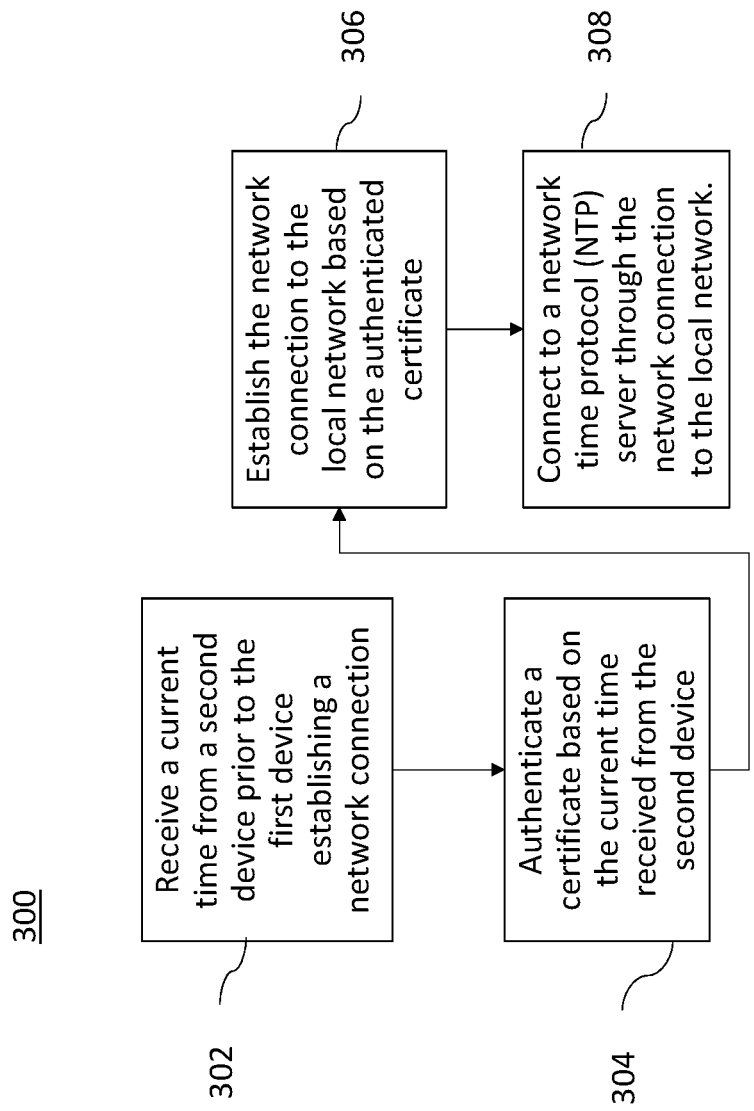
FIG. 4 is a flow chart of an embodiment method according to some embodiments.

FIG. 3 illustrates a block diagram of a wireless, local network 400 having devices 402A, 402B, and 402C. FIG. 4 illustrates a flow chart 300 of a method for acquiring a current time according to some other embodiments. Devices 402A and 402C may each implement the method of flow chart 300, and the following description of flow chart 300 refers to elements of the local network 400 for ease of understanding.

In some embodiments, the flow chart 300 may be implemented by a first device (e.g., either one of the device 402A or the device 402C of FIG. 3) to receive a current time and establish a network connection based on the received current time. In some embodiments, the first device 402A/402C and the local network 400 may be similar to or the same as described above with respect to FIGS. 1 and 2. For example, the first device 402A/402C may be a device without a real time clock, may not have GPS capabilities and/or a GPS connection, and may not be connected to an NTP server. In some embodiments, the local network 400 may be a wireless mesh network which is secured such that the first device 402A/402C's connections to the local network 400 is based on one or more authenticated certificates. Further discussion of these features is omitted for brevity. Flow chart 300 provides a method that allows the first device 402A/402C to receive the current time without a real time clock, GPS connection, or NTP server connection, authenticate one or more certificates based on the current time, and establish a network connecting based on the one or more authenticated certificates.

Flow chart 300 begins with block 302 where the first device 402A/402C receives a current time from a second device (e.g., either one of the device 402A or the device 402B) prior to the first device 402A/402C establishing a network connection. The second device 402A/402B may be a device in the local network.

In some embodiments, receiving, by the first device 402A/402C, the current time from the second device 402A/402B includes receiving, by the first device 402A/402C, the current time from the second device 402A/402B without transmitting, by the first device 402A/402C, a request for the current time. For example, the first device 402A/402C may receive the current time in a broadcast of the second device 402A/402B. In some embodiments, the second device 402A/402B may broadcast the current time in a beacon according to a WiFi standard or Bluetooth standard. In some embodiments, the second device 402A/402B may include a digital signature in its broadcast with the current time, and the first device 402A/402C may verify the digital signature for increased security. In other embodiments, the second device 402A/402B may broadcast the current time using a different mechanism. For example, in FIG. 3, the device 402B is connected to the NTP server 406 (e.g., through a backhaul network) and receives the current time from the NTP server 406. The device 402B may broadcast the current time received from the NTP server 406 in a beacon, for example. The device 402A may periodically update the broadcast with an updated current time that is synchronized with the NTP server 406. Any device within a broadcast radius 404B of the device 402B may determine the current time from the broadcast. For example, the device 402A may receive the current time in the broadcast of the device 402B without first transmitting any requests for the current time.

In some embodiments, the first device 402A/402C may listen for a broadcast with the current time. When the first device 402A/402C does not receive the current time in a broadcast after a third preset time period, the first device 402A/402C may send a request for the current time, for example, in a similar manner as described above with respect to block 104 of FIG. 2. The first device 402A/402C may then receive the current time in response to the transmitted request for the current time.

In other embodiments, the first device 402A/402C receives the current time in a similar manner as described above with respect to blocks 104 and 106 of FIG. 2. For example, the first device 402A/402C may transmit a request for the current time (e.g., in a broadcast probe request), and a second device 402A/402B may hear the request for the current time transmitted by the first device 402A/402C. The first device 402A/402C may then receive the current time from the second device 402A/402B in a unicast (e.g., in a probe response) or in a broadcast.

Referring back to FIG. 4, in block 306, the first device 402A/402C authenticates one or more certificates based on the current time received from the second device 402A/402B, and in block 308, the first device 402A/402C establishes the network connection to the local network 400 based on the authenticated certificate. Authenticating the one or more certificates and establishing the network connection may be performed in a similar manner as described above with respect to blocks 108 and 110 of FIG. 2. In some embodiments, the first device 402A/402C authenticates the one or more certificates with an authentication server (e.g., authentication server 408 of FIG. 3) through another device in the local network, such as the second device 402A/402B that transmitted the current time to the first device 402A/402C. In other embodiments, the first device 402A/402C authenticates the one or more certificates with the authentication server through a different device than the second device 402A/402B that transmitted the current time to the first device 402A/402C. In some embodiments, the first device 402A/402C connects to the local network 400 through another device in the local network 400, such as the second device 402A/402B that transmitted the current time to the first device 402A/402C. For example, in a mesh network, the first device 402A/402C may establish a mesh connection with the second device 402A/402B, and the first device 402A/402B is connected to the local network 400 via the mesh connection. In other embodiments, the first device 402A/402C connects to the local network 400 through a different device than the second device 402A/402B that transmitted the current time to the first device 402A/402C.

In block 310, the first device 402A/402C connects to the NTP server (e.g., NTP server 406 of FIG. 3) through the network connection to the local network 400. For example, the NTP server 406 may be located in a backhaul network (e.g., backhaul network 410), and the first device 402A/402C may be connected to the backhaul network 410 through the network connection to the local network 400. The first device 402A/402C may further synchronize the current time with the NTP server 406. The current time synchronized with the NTP server 406 is more accurate than the current time received from the second device 402A/402B. For example, due to transmission latency, the current time received from the second device 402A/402B may be accurate only within a certain range (e.g., a few seconds or more, and the current time synchronized with the NTP server 406 may be accurate within 100 ms or less, for example.

Subsequently, in some embodiments, the first device 402A/402C may broadcast the current time (e.g., the current synchronized with the NTP server) without receiving any requests for the current time from other devices. In some embodiments, the first device 402A/402C may broadcast the current time in a beacon of the first device. In some embodiments, the first device 402A/402C may include a digital signature in its broadcast with the current time. In other embodiments, the first device 402A/402C may broadcast the current time using a different mechanism. For example in FIG. 3, the device 402A may now be connected to the backhaul network 410 through the local network 400. The device 402A may synchronize its current time with the NTP server 406 and broadcast the synchronized current time without receiving any requests for the current time. Any device (e.g., device 402C) within a broadcast radius 404A of the device 402A may receive the current time in the broadcast without sending any requests for the current time. The device 402A may periodically update the broadcast with an updated current time synchronized with the NTP server 406. This method (e.g., reading the current time in a broadcast, connecting to the server, synchronizing the current time with the NTP server 406, and broadcasting the synchronized current time) may be repeated by each device in the local network 400. In this manner, the current time may be propagated and broadcast throughout a local network 400 without needing to send requests for current time.

Alternatively, in some other embodiments, the first device 402A/402C may transmit the current time that is synchronized with the NTP server 406 to a third device if the first device 402A/402C receives a request for the current time from the third device. For example in FIG. 3, the device 402A may receive a request for the current time from the device 402C, and the device 402A may transmit the current time synchronized with the NTP server 406 to the device 402C in response to receiving the request for the current time from the device 402C.

Figure 5:
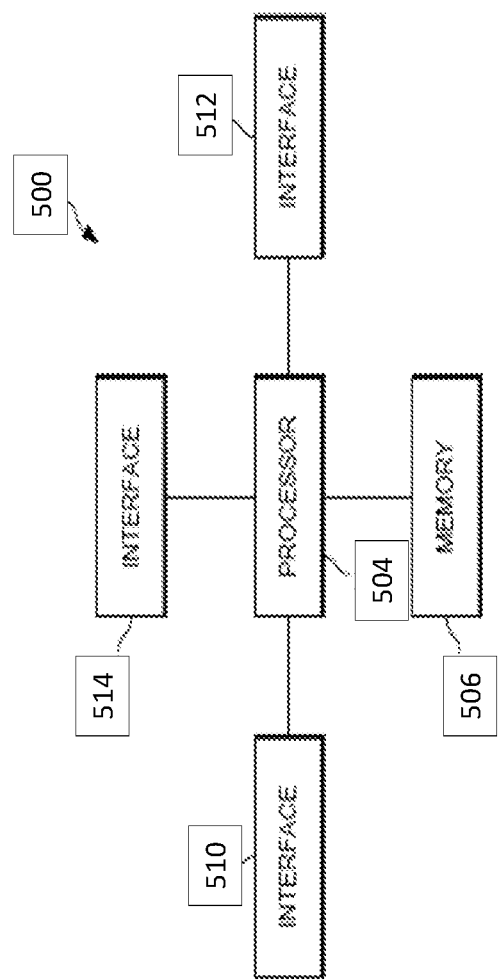
FIG. 5 is a block diagram of a processing system according to some embodiments.

FIG. 5 illustrates a block diagram of an embodiment processing system 500 for performing methods described herein, which may be installed in a host device (e.g., an apparatus). In some embodiments, as described above, the host device may not have a real time clock and/or GPS capabilities. As shown, the processing system 500 includes a processor 504, a memory 506, and interfaces 510-514, which may (or may not) be arranged as shown in FIG. 5. The processor 504 may be any component or collection of components adapted to perform computations and/or other processing related tasks, and the memory 506 may be any component or collection of components adapted to store programming and/or instructions for execution by the processor 504. The processor 504 may execute programming stored in the memory 506 such that the processor 504 is configured to perform the operations of the programming. In an embodiment, the memory 506 may include a non-transitory computer readable medium. The interfaces 510, 512, 514 may be any component or collection of components that allow the processing system 500 to communicate with other devices/components and/or a user. For example, one or more of the interfaces 510, 512, 514 may be adapted to communicate data, control, or management messages from the processor 504 to applications installed on the host device and/or a remote device. As another example, one or more of the interfaces 510, 512, 514 may be adapted to allow a user or user device (e.g., personal computer (PC), etc.) to interact/communicate with the processing system 500. The processing system 500 may include additional components not depicted in FIG. 6, such as long term storage (e.g., non-volatile memory, etc.).

In some embodiments, the processing system 500 is included in a network device that is accessing, or part otherwise of, a telecommunications network. In one example, the processing system 500 is in a network-side device in a wireless or wireline telecommunications network, such as a base station, a relay station, a scheduler, a controller, a gateway, a router, an applications server, or any other device in the telecommunications network. In other embodiments, the processing system 500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 6:
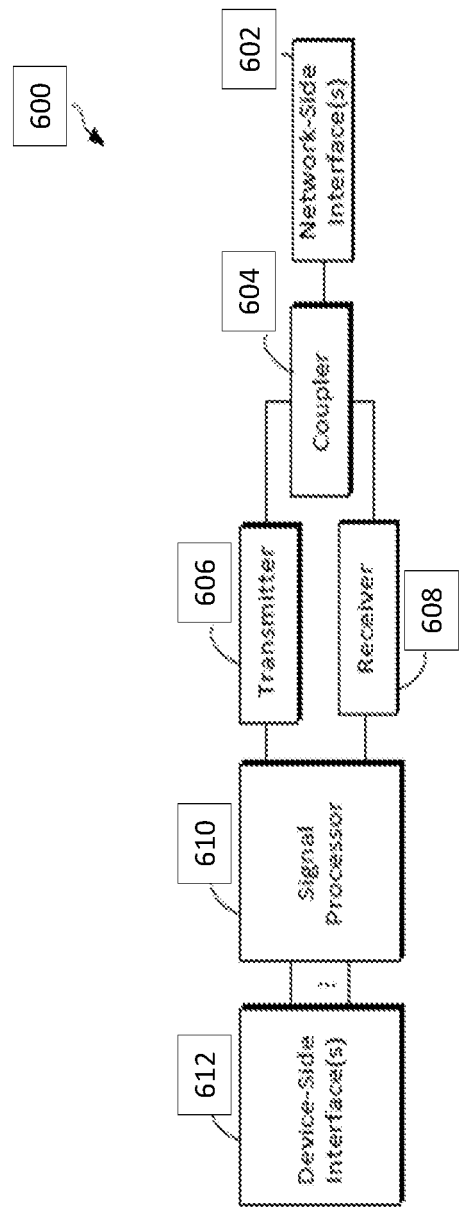
FIG. 6 is a block diagram of a transceiver according to some embodiments.

In some embodiments, one or more of the interfaces 510, 512, 514 connects the processing system 500 to a transceiver adapted to transmit and receive signaling over the telecommunications network. FIG. 6 illustrates a block diagram of a transceiver 600 adapted to transmit and receive signaling over a telecommunications network. The transceiver 600 may be installed in a host device. As shown, the transceiver 600 comprises a network-side interface 602, a coupler 604, a transmitter 606, a receiver 608, a signal processor 610, and a device-side interface 612. The network-side interface 602 may include any component or collection of components adapted to transmit or receive signaling over a wireless or wireline telecommunications network. The coupler 604 may include any component or collection of components adapted to facilitate bi-directional communication over the network-side interface 602. The transmitter 606 may include any component or collection of components (e.g., up-converter, power amplifier, etc.) adapted to convert a baseband signal into a modulated carrier signal suitable for transmission over the network-side interface 602. The receiver 608 may include any component or collection of components (e.g., down-converter, low noise amplifier, etc.) adapted to convert a carrier signal received over the network-side interface 602 into a baseband signal. The signal processor 610 may include any component or collection of components adapted to convert a baseband signal into a data signal suitable for communication over the device-side interface(s) 612, or vice-versa. The device-side interface(s) 612 may include any component or collection of components adapted to communicate data-signals between the signal processor 610 and components within the host device (e.g., the processing system 500, local area network (LAN) ports, etc.).

The transceiver 600 may transmit and receive signaling over any type of communications medium. In some embodiments, the transceiver 600 transmits and receives signaling over a wireless medium. For example, the transceiver 600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 602 comprises one or more antenna/radiating elements. For example, the network-side interface 602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   determining, by a first device, whether the first device has a current time;
   transmitting, by the first device, a request for the current time to a second device in a local network if the first device does not have the current time;
   receiving, by the first device, the current time from the second device;
   authenticating, by the first device, a certificate based on the current time received from the second device; and
   establishing, by the first device, a network connection to the local network based on the authenticated certificate.

2. The method of claim 1, wherein establishing, by the first device, the network connection to the local network based on the authenticated certificate comprises establishing the network connection through a third device in the local network.

3. The method of claim 2, wherein the third device is the second device.

4. The method of claim 1, further comprising:
   connecting to a network time protocol (NTP) server through the local network; and
   synchronizing the current time with the NTP server, the current time synchronized with the NTP server being more accurate than the current time received from the second device.

5. The method of claim 4 further comprising:
   receiving a request for the current time from a fourth device; and
   transmitting, to the fourth device, the current time synchronized with the NTP server.

6. The method of claim 1 further comprising:
   receiving a request for the current time from a fourth device prior to receiving the current time from the second device; and
   transmitting, to the fourth device, the current time received from the second device if the current time is received from the second device without a preset time period of receiving the request for the current time from the fourth device.

7. The method of claim 6 further comprising not sending, to the fourth device, the current time received from the second device if the current time is not received from the second device within the preset time period of receiving the request for the current time from the fourth device.

8. The method of claim 7 further comprising forwarding, by the first device, the request for the current time received from the fourth device.

9. The method of claim 1, wherein:
- transmitting the request for the current time comprises broadcasting the request for the current time in a probe request; and
- receiving the current time from the second device comprises receiving the current time in a probe response.

10. The method of claim 1, wherein determining whether the first device has a current time comprises:
- comparing a calendar time of the first device with a sum of a boot-up calendar time of the first device and an elapsed time of the first device, wherein the elapsed time of the first device is an amount of time that has elapsed since the first device booted up; and
- determining that the first device does not have the current time if the calendar time is equal to the sum of the boot-up calendar time of the first device and the elapsed time of the first device.

11. A method comprising:
- receiving, by a first device, a current time from a second device prior to the first device establishing a network connection, the second device being connected to a local network;
- authenticating, by the first device, a certificate based on the current time received from the second device;
- establishing, by the first device, the network connection to the local network based on the authenticated certificate; and
- connecting, by the first device, to a network time protocol (NTP) server through the network connection to the local network.

12. The method of claim 11, wherein receiving, by the first device, the current time from the second device comprises receiving, by the first device, the current time from the second device without transmitting, by the first device, a request for the current time.

13. The method of claim 11, wherein receiving the current time from the second device comprises receiving the current time in a broadcast from the second device.

14. The method of claim 11, wherein receiving the current time from the second device comprises receiving the current time in a unicast from the second device.

15. An apparatus, comprising:
- a processor configured to determine whether the apparatus has a current time;
- a transmitter configured to transmit a request for the current time to another apparatus in a local network if the apparatus does not have the current time; and
- a receiver configured to receive the current time from the another apparatus in the local network;
- wherein the processor is further configured to:
  - authenticate a certificate based on the current time received from the another apparatus; and
  - establish a network connection to the local network based on the authenticated certificate.

16. The apparatus of claim 15, wherein the processor is further configured to connect to a network time protocol (NTP) server through the local network.

17. The apparatus of claim 16, wherein the processor is further configured to connect, in a different operating mode, to the NTP server without the authenticated certificate.

18. The apparatus of claim 16, wherein the processor is further configured to synchronize the current time with the NTP server.

19. The apparatus of claim 15, wherein the apparatus does not have global positioning service (GPS) capabilities.

20. The apparatus of claim 15, wherein:
- the request for the current time is broadcast in a probe request; and
- the current time is received from the another apparatus in a probe response.

* * * * *